United States Patent [19]

Katoh et al.

[11] Patent Number: 4,871,474

[45] Date of Patent: Oct. 3, 1989

[54] PHOSPHOR

[75] Inventors: Takayuki Katoh; Yuichi Hosoi; Kenji Takahashi, all of Kaisei, Japan

[73] Assignee: Fuji Photo Film Co., Ltd., Japan

[21] Appl. No.: 237,692

[22] Filed: Aug. 26, 1988

Related U.S. Application Data

[63] Continuation of Ser. No. 110,535, Oct. 20, 1987, abandoned, which is a continuation of Ser. No. 797,972, Nov. 14, 1985, abandoned.

[30] Foreign Application Priority Data

Nov. 16, 1984 [JP] Japan .................................. 59-240451

[51] Int. Cl.$^4$ ............................................. C09K 11/61
[52] U.S. Cl. ............................................. 252/301.4 H
[58] Field of Search ................................. 252/301.4 H

[56] References Cited

U.S. PATENT DOCUMENTS 3,163,608 12/1964 Yocom ..................... 252/301.4 H X
3,447,097 5/1969 Kiss ........................ 252/301.4 H X
4,505,989 3/1985 Umemoto et al. ....... 252/301.4 H X

FOREIGN PATENT DOCUMENTS 29963 6/1981 European Pat. Off. ..... 252/301.4 H
2642226 3/1978 Fed. Rep. of Germany ... 252/301.4 H Primary Examiner—Jack Cooper
Attorney, Agent, or Firm—Gerald G. Ferguson, Jr.

[57] ABSTRACT

A divalent europium activated alkaline earth metal complex halide phosphor having the formula (I):

$$M^{II}X_2 \cdot aM^{II}X'_2 \cdot bM^{I}X'':xEu^{2+} \qquad (I)$$

in which $M^{II}$ is at least one alkaline earth metal selected from the group consisting of Ba, Sr and Ca; $M^{I}$ is at least one alkali metal selected from the group consisting of Li and Na; each of X and X' is at least one halogen selected from the group consisting of Cl, Br and I, and $X \neq X'$; X" is at least one halogen selected from the group consisting of F, Cl, Br and I; and a, b and x are numbers satisfying the conditions of $0.1 \leq a \leq 10.0$, $0 < b \leq 2 \times 10^{-1}$ and $0 < x \leq 0.2$, respectively. A process for the preparation of said phosphor is also disclosed.

6 Claims, 1 Drawing Sheet

PHOSPHOR

This application is a continuation of serial number 110,535, filed 10/20/87, now abandoned, which itself was a continuation of application Ser. No. 797,972, filed 11/14/85, now abandoned.

BACKGROUND OF THE INVENTION

1. Field of the Invention

The present invention relates to a phosphor and a process for the preparation of the same, and more particularly, to a divalent europium activated alkaline earth metal complex halide phosphor and a process for the preparation of the same.

2. Description of the Prior Art

There is well known a divalent europium activated alkaline earth metal fluorohalide phosphor ($M^{II}FX:Eu^{2+}$, in which $M^{II}$ is at least one alkaline earth metal selected from the group consisting of Ba, Sr and Ca; and X is a halogen other than fluorine), as a divalent europium activated alkaline earth metal halide phosphor. The phosphor gives emission (spontaneous emission) in the near ultraviolet region when exposed to a radiation such as X-rays. The phosphor also gives emission (stimulated emission) in the near ultraviolet region when excited with an electromagnetic wave such as visible light or infrared rays after exposure to a radiation such as X-rays, that is, the phosphor is a stimulable phosphor.

The present inventor discovered a novel divalent europium activated alkaline earth metal halide phosphor having the following formula:

$M^{II}X_2.aM^{II}X'_2:xEu^{2+}$ in which $M^{II}$ is at least one alkaline earth metal selected from the group consisting of Ba, Sr and Ca; each of X and X' is at least one halogen selected from the group consisting of Cl, Br and I, and $X \neq X'$; and a and x are numbers satisfying the conditions of $0.1 \leq a \leq 10.0$ and $0 < x \leq 0.2$, respectively, and applied for a patent with respect to said phosphor (Japanese Patent Provisional Publication No. 60(1985)-84381, corresponding to U.S. patent application No. 660,987 and European Patent Application No. 84112417.5).

The novel divalent europium activated alkaline earth metal halide phosphor has been confirmed to have a crystal structure different from that of the aforementioned $M^{II}FX:Eu^{2+}$ phosphor on the basis of the X-ray diffraction patterns as described in the above application. This phosphor gives spontaneous emission (peak wavelength: approx. 405 nm) in the near ultraviolet to blue region upon exposure to a radiation such as X-rays, ultraviolet rays or cathode rays, and also gives stimulated emission in the near ultraviolet to blue region when excited with an electromagnetic wave having a wavelength within the region of 450-1000 nm after exposure to a radiation such as X-rays, ultraviolet rays or cathode rays. Accordingly, the phosphor is very useful for a radiographic intensifying screen employed in the conventional radiography and for a radiation image storage panel employed in the radiation image recording and reproducing method utilizing a stimulable phosphor.

It is desired that the luminance of spontaneous emission of this useful phosphor is as high as possible.

SUMMARY OF THE INVENTION

The present invention provides a novel divalent europium activated alkaline earth metal halide phosphor which is improved in the luminance of spontaneous emission and a process for the preparation of the same.

The present inventors have studied on the above-mentioned novel divalent europium activated alkaline earth metal halide phosphor, and as a result, they have found that a phosphor further containing a specific amount of alkali metal halide shows spontaneous emission of high luminance, to accomplish the invention.

The phosphor of the invention is a divalent europium activated alkaline earth metal complex halide phosphor having the formula (I):

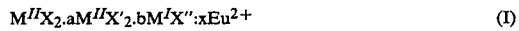
$M^{II}X_2.aM^{II}X'_2.bM^{I}X'':xEu^{2+}$ (I)

in which $M^{II}$ is at least one alkaline earth metal selected from the group consisting of Ba, Sr and Ca; $M^{I}$ is at least one alkali metal selected from the group consisting of Li and Na; each of X and X' is at least one halogen selected from the group consisting of Cl, Br and I, and $X \neq X'$; X" is at least one halogen selected from the group consisting of F, Cl, Br and I; and a, b and x re numbers satisfying the conditions of $0.1 \leq a \leq 10.0$, $0 < b \leq 2 \times 10^{-1}$ and $0 < a \leq 0.2$, respectively.

The process for the preparation of the phosphor having the formula (I) of the invention comprises:

mixing starting materials for the phosphor in a stoichiometric ratio corresponding to the formula (II):

$m^{II}X_2.aM^{II}X'_2.bM^{I}X'':xEu$ (II)

in which in which $M^{II}$, $M^{II}X'$, X", a, b and x have the same meanings as defined above; and firing the obtained mixture at a temperature within the range of 400°–1300° C. in an inert atmosphere or a weak reducing atmosphere.

In the invention, the luminance of spontaneous emission given when exciting a phosphor with a radiation such as X-rays is enhanced by incorporating the specific amount of alkali metal halide (sodium halide and/or lithium halide) into the novel divalent europium activated alkaline earth metal halide phosphor.

DETAILED DESCRIPTION OF THE INVENTION

Figure 1:
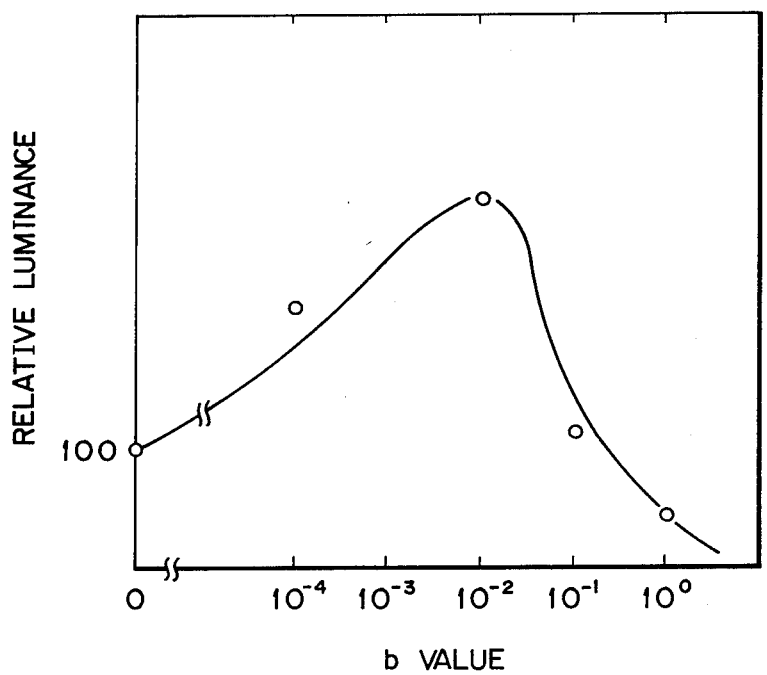
FIG. 1 shows a relationship between b value and luminance of spontaneous emission with respect to $BaCl_2.BaBr_2.bNaBr:0.001Eu^{2+}$ phosphor, which is an example of the divalent europium activated alkaline earth metal complex halide phosphor according to the invention.

The divalent europium activated alkaline earth metal complex halide phosphor of the present invention can be prepared, for instance, by a process described below.

As starting materials, the following materials can be employed:

(1) at least two alkaline earth metal halides selected from the group consisting of $BaCl_2$, $SrCl_2$, $CaCl_2$, $BaBr_2$, $SrBr_2$, $CaBr_2$, $BaI_2$, $SrI_2$ and $CaI_2$;

(2) at least one alkali metal halide selected from the group consisting of LiF, NaF, LiCl, NaCl, LiBr, NaBr, LiI and NaI; and (3) at least one compound selected from the group consisting of europium compounds such as europium halide, europium oxide, europium nitrate and europium sulfate.

As the above starting material (1), two or more kinds of alkaline earth metal halides having a halogen different from each other are employed. Further, ammonium halide (NH$_4$X''', in which X''' is any one of Cl, Br and I) may be employed as a flux.

In the process for the preparation of the phosphor of the invention, the above-mentioned alkaline earth metal halides (1), alkali metal halide (2) and europium compound (3) are, in the first place, mixed in the stoichiometric ratio corresponding to the formula (II):

$$M^{II}X_2 \cdot aM^{II}X'_2 \cdot bM^{I}X'' : xEu \qquad (II)$$

in which $M^{II}$ is at least one alkaline earth metal selected from the group consisting of Ba, Sr and Ca; $M^{I}$ is at least one alkali metal selected from the group consisting of Li and Na; each of X and X' is at least one halogen selected from the group consisting of Cl, Br and I, and X≠X'; X'' is at least one halogen selected from the group consisting of F, Cl, Br and I; and a, b and x are numbers satisfying the conditions of $0.1 \leq a \leq 10.0$, $0 < b \leq 2 \times 10^{-1}$ and $0 < x \leq 0.2$, respectively.

In the preparation of the phosphor of the invention, from the viewpoint of enhancement in the luminance of spontaneous emission, the number for b which indicates the amount of the additive alkali metal halide ($M^{I}X''$) is preferably within the range of $10^{-4} \leq b \leq 5 \times 10^{-2}$ and $M^{I}$ is preferably Na. From the same viewpoint, the number for a which indicates the ratio between $M^{II}X_2$ and $M^{II}X'_2$ is preferably within the range of $0.3 \leq a \leq 3.3$ and more preferably of $0.5 \leq a \leq 2.0$, and the number for x indicating the amount of europium activator is preferably within the range of $10^{-5} \leq x \leq 10^{-1}$.

The mixture of starting materials for the phosphor is prepared by any one of the following procedures;

(i) simply mixing the starting materials (1), (2) and (3);

(ii) mixing the starting materials (1) and (2), heating the obtained mixture at a temperature of not lower than 100° C. for several hours and then mixing the heat-treated mixture with the starting material (3); and (iii) mixing the starting materials (1) and (2) in the form of a solution, drying the solution by reduced pressure drying, vacuum drying or spray drying under heating (preferably, 50°-200° C.), and then mixing the obtained dry product with the starting material (3).

Further, as a modification of the above procedure (ii), there may be mentioned a procedure comprising mixing the starting materials (1), (2) and (3) and subjecting the obtained mixture to the heating treatment; or a procedure comprising mixing the starting materials (1) and (3), subjecting the obtained mixture to the heating treatment and mixing the starting material (2) with the heat-treated product. As other modification of the procedure iii), there may be mentioned a procedure comprising mixing the starting materials (1), (2) and (3) in the form of a solution and subjecting the solution to the drying; or a procedure comprising mixing the starting materials (1) and (3) in the form of a solution, subjecting the solution to the drying and mixing the obtained dry product with the starting material (2).

The mixing is carried out using a conventional mixing apparatus such as a variety of mixers, a V-type blender, a ball mill and a rod mill in any case of the abovedescribed procedures (i), (ii) and (iii).

Then, the resulting mixture of the starting materials is placed in a heat-resistant container such as a quartz boat, an alumina crucible or a quartz crucible, and fired in an electric furnace. The temperature for the firing suitably ranges from 400° to 1300° C. and preferably ranges from 500° to 1000° C. From the viewpoint of the emission luminance or the like, the firing temperature lower than the melting point of the phosphor (approx. 875° C.) is particularly preferable. The firing period is determined depending upon the amount of the mixture of starting materials, the firing temperature, etc., and suitably ranges from 0.5 to 6 hours. As the firing atmosphere, there can be employed an inert atmosphere such as a nitrogen gas atmosphere or an argon gas atmosphere; or a weak reducing atmosphere such as a nitrogen gas atmosphere containing a small amount of hydrogen gas or a carbon dioxide gas atmosphere containing carbon monoxide gas. A trivalent europium compound is generally employed as the above-mentioned starting material (3) and in the firing stage, the trivalent europium contained in the mixture is reduced into divalent europium.

After firing the mixture of starting materials for the phosphor, the fired product is allowed to stand for cooling and pulverized. The pulverized product may be further fired (second firing). The second firing is conducted at a temperature of 400°-800° C. for 0.5-12 hours in the above-mentioned inert atmosphere or weak reducing atmosphere.

Through the firing procedure, a powdery phosphor of the invention is produced. The powdery phosphor may be processed in a conventional manner involving a variety of procedures for the preparation of phosphors such as a washing procedure, a drying procedure and a sieving procedure.

The phosphor of the present invention prepared in accordance with the above-described process is a divalent europium activated alkaline earth metal complex halide phosphor having the formula (I):

$$M^{II}X_2 \cdot aM^{II}X'_2 \cdot bM^{I}X'' : xEu^{2+} \qquad (I)$$

in which $M^{II}$, $M^{I}$, X, X', X'', a, b and x have the same meanings as defined above.

The prepared phosphor gives spontaneous emission in the near ultraviolet to blue region (peak wavelength of the emission: approx. 409 nm) upon excitation with a radiation such as X-rays, ultraviolet rays or cathode rays.

The phosphor of the invention is very useful as a phosphor for the use of a radiographic intensifying screen employed in the conventional radiography, said screen being used in medical radiography such as X-ray photography for medical diagnosis and industrial radiography for non-destructive inspection.

The present invention will be illustrated by the following examples, but these examples by no means restrict the invention.

EXAMPLE 1

Mixed were 192.7 g. of an aqueous solution of barium bromide (BaBr$_2$, $1.55 \times 10^{-3}$ mol/g.), 253.5 g. of an aqueous solution of barium chloride (BaCl$_2$, $1.18 \times 10^{-3}$ mol/g.) and 1.06 ml of an aqueous solution of europium bromide (EuBr$_3$, $2.841 \times 10^{-4}$ mol/ml). The mixed aqueous solution was dried at 60° C. under reduced pressure for 3 hours and further dried at 150° C. under vacuum for another 3 hours to obtain a mixture of starting materials for the preparation of a phosphor.

Then, 10 g. of the obtained mixture and 2.04 mg. of sodium bromide (NaBr) were sufficiently mixed and placed in an alumina crucible, which was, in turn, placed in a high-temperature electric furnace. The mixture was then fired at 850° C. for 1.5 hours under a carbon dioxide atmosphere containing carbon monoxide. After the firing was complete, the crucible was taken out of the furnace and allowed to stand for cooling. Thus, a divalent europium activated barium complex halide phosphor ($BaCl_2 \cdot BaBr_2 \cdot 0.001NaBr:0.001Eu^{2+}$) was obtained.

EXAMPLE 2

The procedure of Example 1 were repeated except for changing the amount of sodium bromide into 0.204 mg., 20.4 mg. and 204 mg., respectively, to obtain a variety of divalent europium activated barium complex halide phosphors ($BaCl_2 \cdot BaBr_2 \cdot bNaBr:0.001Eu^{2+}$, in which b is 0.0001, 0.01 or 0.1).

COMPARISON EXAMPLE 1

The procedure of Example 1 was repeated except for not adding sodium bromide to the mixture of starting materials, to obtain a divalent europium activated barium chlorobromide phosphor ($BaCl_2 \cdot BaBr_2: 0.001Eu^{2+}$).

The phosphors prepared in Examples 1 and 2 and Comparison Example 1 were excited with X-rays at 80 KVp to measure luminance of spontaneous emission. The results are shown in FIG. 1.

FIG. 1 graphically shows a relationship between a content of sodium bromide (b value) and luminance of spontaneous emission with respect to $BaCl_2 \cdot BaBr_2 \cdot bNaBr: 0.001Eu^{2+}$ phosphor.

As is evident from FIG. 1, the $BaCl_2 \cdot BaBr_2 \cdot bNaBr: 0.001Eu^{2+}$ phosphor of the invention was enhanced in the luminance of spontaneous emission in the b value range of $0 < b \leq 2 \times 10^{-1}$. Especially, the emission luminance of the phosphor was higher in the range of $10^{-4} \leq b \leq 5 \times 10^{-2}$.

EXAMPLE 3

The procedure of Example 1 was repeated except for using 0.8 mg. of sodium fluoride (NaF) instead of sodium bromide, to obtain a divalent europium activated barium complex halide phosphor ($BaCl_2 \cdot BaBr_2 \cdot 0.001NaF:0.001Eu^{2+}$).

EXAMPLE 4

The procedure of Example 1 was repeated except for using 1.2 mg. of sodium chloride (NaCl) instead of sodium bromide, to obtain a divalent europium activated barium complex halide phosphor ($BaCl_2 \cdot BaBr_2 \cdot 0.001NaCl: 0.001Eu^{2+}$).

EXAMPLE 5

The procedure of Example 1 was repeated except for using 3.0 mg. of sodium iodide (NaI) instead of sodium bromide, to obtain a divalent europium activated barium complex halide phosphor ($BaCl_2 \cdot BaBr_2 \cdot 0.001NaI:0.001Eu^{2+}$).

EXAMPLE 6

The procedure of Example 1 was repeated except for using 2.08 mg. of lithium bromide ($LiBr \cdot H_2O$) instead of sodium bromide, to obtain a divalent europium activated barium complex halide phosphor ($BaCl_2 \cdot BaBr_2 \cdot 0.001LiBr: 0.001Eu^{2+}$).

The phosphors prepared in Examples 3 through 6 were excited with X-rays at 80 KVp to measure luminance of spontaneous emission. The results are set forth in Table 1. The results on Example 1 and Comparison Example 1 are also set forth in Table 1.

TABLE 1

| Relative Luminance of Spontaneous Emission | |
|---|---|
| Example | |
| 1 | 120 |
| 3 | 117 |
| 4 | 133 |
| 5 | 120 |
| 6 | 110 |
| Com. Example | |
| 1 | 100 |

We claim:
1. A divalent europium activated alkaline earth metal complex halide phosphor having the formula (I):

$$M^{II}X_2 \cdot aM^{II}X'_2 \cdot bM^{I}X'':xEu^{2+} \qquad (I):$$

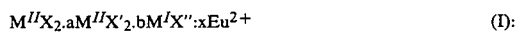

in which $M^{II}$ is at least one alkaline earth metal selected from the group consisting of Ba, Sr and Ca; $M^{I}$ is at least one alkali metal selected from the group consisting of Li and Na; each of X and X' is at least one halogen selected from the group consisting of Cl, Br and I, and $X \neq X'$; X'' is at least one halogen selected from the group consisting of F, Cl, Br and I; and a, b and x are numbers satisfying the conditions of $0.1 \leq a \leq 10.0$, $10^{-4} \leq b \leq 5 \times 10^{-2}$ and $0 < x \leq 0.2$, respectively.

2. The phosphor as claimed in claim 1, in which $M^{I}$ in the formula (I) is Na.

3. The phosphor as claimed in claim 1, in which a in the formula (I) is a number satisfying the condition of $0.3 \leq a \leq 3.3$.

4. The phosphor as claimed in claim 1, in which $M^{II}$ in the formula (I) is Ba.

5. The phosphor as claimed in claim 1, in which each of X and X' in the formula (I) is Cl or Br.

6. The phosphor as claimed in claim 1, in which x in the formula (I) is a number satisfying the condition of $10^{-5} \leq x \leq 10^{-1}$.

* * * * *